May 13, 1969 H. L. BOWERS 3,444,079
METHOD AND APPARATUS FOR DEMINERALIZING WATER
Filed Nov. 14, 1966
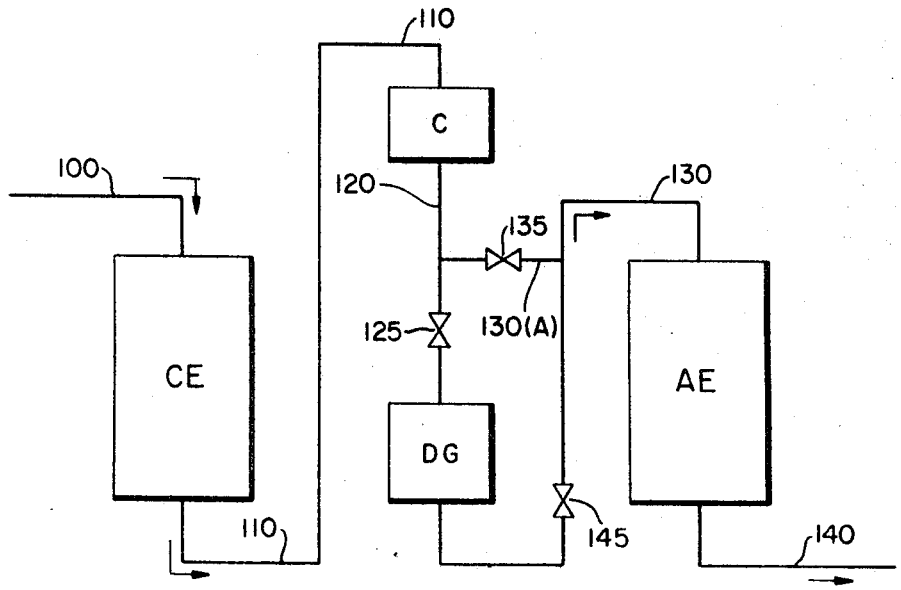
INVENTOR.
HERBERT L. BOWERS
BY Theodore B Roussel
ATTORNEY

United States Patent Office 3,444,079
Patented May 13, 1969

---

3,444,079
METHOD AND APPARATUS FOR DEMINERALIZING WATER
Herbert L. Bowers, Fair Lawn, N.J., assignor to Ritter Pfaudler Corporation, Rochester, N.Y., a corporation of New York
Filed Nov. 14, 1966, Ser. No. 593,944
Int. Cl. C02b 1/56, 1/42
U.S. Cl. 210—37         5 Claims

ABSTRACT OF THE DISCLOSURE

An arrangement of cation and anion exchangers and an activated carbon filter for use in the demineralization of water containing organic foulants which has the activated carbon filter interposed between the cation exchanger and the anion exchanger so that the low pH effluent of the cation exchanger is used to increase the capacity of the activated carbon for removing organic foulants from the cation exchanger effluent.

---

The present invention relates generally to the demineralization of water and more particularly to the use of an activated carbon filter in combination with cation and anion exchangers for removing foulants to improve the overall efficiency of demineralization.

Natural water such as ground water, river water or lake water and the like is usually found in the native state with a high dissolved mineral content. Removing the dissolved salts of such metals as magnesium and calcium to produce softened water is a well-known art. For example, one method for demineralizing water is illustrated in the Ikuno U.S. Patent No. 3,203,894 which includes treating the water with chemical additives so as to precipitate chlorides and sulfides of calcium and magnesium and the like as insoluble compounds. U.S. Patent No. 2,368,055 to Walker describes another method which includes treating the water with chemicals to form precipitates and with activated biological agents such as aerobic bacteria to remove objectionable colors, tastes and odors and then filtering the water through a bed of activated carbon as a last step. Still another method of demineralization includes passing the water through cation and anion exchangers to remove the dissolved mineral ions. In a typical arrangement for removing dissolved minerals, the natural water is passed first through the cation exchanger which contains a resin in the hydrogen ion form. In the cation exchanger, these metallic salts will exchange metal ions for hydrogen ions and thus be converted to their corresponding acids, the metal being retained on the cation resin. Thus, the effluent of the cation exchanger due to the formation of acid is less basic than the untreated water. This treated effluent is then passed through the anion exchanger which contains an anion exchange resin in the hydroxide form. In the anion exchanger, hydroxide ions exchange with the anions of the cation exchanger effluent and combine with the hydrogen ions therein to form water, the anion radical of the salt being retained on the anion exchange resin. In this manner, the dissolved mineral ions are substantially removed to produce a demineralized or softened water.

Natural water may further contain a substantial quantity of undesirable organic materials in suspension which originate from decaying plant and animal life. Such organic materials often become adsorbed on the surfaces and in the pores of the anion exchange resin which fouls them by providing an ion impassible barrier. This barrier substantially reduces the efficiency of the anion exchange resin for exchanging inorganic ions. Overall efficiency of demineralization is further reduced because of the down time required to free the fouled anion exchange resin by frequent flushing of organic materials therefrom or because irreparably fouled resin must be replaced. The problem posed by fouling of the anion exchanger by organic materials is well recognized in the art as illustrated by the discussion in the Blight patent, No. 3,147,215, at column 1 lines 44–70.

One method previously used for removing organic foulants is to install a filter upstream of the cation exchanger, to remove some portion of the organic matter and thus reduce the amount of organic fouling that would ordinarily otherise occur in an anion exchanger downstream to the cation exchanger. Filter beds of activated carbon have proved suitable for this purpose.

Natural water generally has a pH value of about 6 or above. However, it has been established that a filter bed of activated carbon operates most efficiently in an acidic or low pH environment. In this respect, see "Considerations in the Isolation and Measurement of Organic Refractories in Water" by Myrick and Tyckman, an article appearing in the Journal of the American Water Works Association, vol. 55, No. 6, at page 783, where the authors concluded that an adjustment of the pH value of the water to an acidic condition increased the amount of organic material removed by an activated carbon filter approximately 50% over the amount removed from water with a basic pH value.

One prior art method of lowering the pH value of natural water was by the injection of a strong mineral acid such as hydrochloric or sulfuric at a point upstream of the activated carbon filter. Another method has been to preheat the bed of activated carbon with a strong acid. These methods necessitate the added expense of acid handling equipment and of the acid itself. The addition of the pretreating acid to lower the pH also renders the cation and anion exchangers less efficient, for now these exchangers must cope with the removal of the additional and foreign ions added and present due to the acid pretreatment.

I have found that the difficulties and disadvantages inherent in these prior art methods of injecting an acid upstream of the activated carbon filter or pretreating the activated carbon filter bed with an acid can be obviated by locating the filter on the discharge side of the cation exchanger. With this arrangement the effluent of the cation exchanger, which is less basic than untreated water, provides the low pH environment for increasing the filtering capacity of the activated carbon.

Accordingly, it is an object of my invention to provide a novel arrangement of a cation exchanger and an activated carbon filter which increases the filtering capacity of the activated carbon without the need for acid injection or pretreatment.

Another object of my invention is to provide an apparatus and method for demineralizing water which increases the overall efficiency of demineralization by increasing the amount of organic materials removed from the water.

A further object of my invention is to provide an apparatus and method for demineralizing water which reduces the amount of fouling occurring in the anion exchanger resulting from organic materials in the water becoming adsorbed on the surfaces of the anion exchange resins.

The demineralizing apparatus constructed in accordance with my invention can be characterized in one aspect thereof by the provision of an activated carbon filter disposed between a cation exchanger and an anion exchanger wherein effluent from the cation exchanger is of sufficiently low pH to substantially increase the efficiency of the activated carbon filter for removing organic foulants.

These and other objects, advantages and characterizing features of my invention will become more apparent upon consideration of the following detailed description thereof when taken in conjunction with the accompanying drawing in which the sole figure is a schematic representation of an embodiment of the water demineralizing apparatus of my invention.

Referring now in detail to the drawing, the figure shows a preferred embodiment of the apparatus of my invention to include a cation exchanger CE, an activated carbon filter C, a degasifier DG and an anion exchanger AE. The cation exchanger preferably contains a cation exchange resin bed in the hydrogen form and the anion exchanger contains an anion exchange resin bed in the hydroxide form. A feed line 100 conducts feed water from a natural supply, not shown, to the cation exchanger. As the water passes through the cation exchanger, high hardness imparting metallic ions are removed from the water and are replaced by hydrogen ions. The hydrogen ions adde by this ion exchange process in the cation exchanger act to lower the pH value of the effluent from the cation exchanger to some point below the pH value of the untreated water. I have found that for best results, the effluent of the cation exchanger should have a pH in the value range of 2 to 4 for purposes set out hereinbelow. From cation exchanger CE, the water passes by means of line 110 to activated carbon filter C. As stated hereinabove, it has been established that a filter bed of activated carbon operates more efficiently in a relatively low pH environment. The effluent of the cation exchanger having a pH value in the range of 2 to 4 provides this relatively low pH environment. Due to the relatively low pH value of the cation exchanger effluent, the activated carbon filter is able to operate in an environment which is considerably less basic than natural water. Thus, the activated carbon filter is able to remove a relatively larger quantity of organic foulants carried in suspension by the water. Filtered water then passes from the carbon exchanger through line 120 and into degasifier DG. Degasifier DG is an optional feature of the invention which may be desirably used where the raw water is high in bicarbonates or dissolved gases such as carbon dioxide. The purpose of degasifier DG is to remove or reduce the carbon dioxide content of the water and thus reduce the load on the anion exchanger. From degasifier DG water passes through line 130 into anion exchanger AE for removal of anions, following which deionized water passes through and out line 140 to a point of use not shown.

If the natural water is not high in bicarbonates and degasifier DG is not needed, a shunt line 130(a) and valves 125, 135 and 145 are provided to shunt effluent from the activated carbon filter directly to the anion exchange by passing the degasifier. When degasifier DG is not needed, valves 125 and 145 are closed and valve 135 opened to permit water to flow from carbon filter C through lines 120, 130a and 130 and into anion exchanger AE. When degasifier DG is needed, valve 135 is closed and valves 125 and 145 are opened to permit effluent from the filter to flow through the degasifier.

A test was conducted with my apparatus under the following test conditions. River water was pretreated in the laboratory by pH adjustment and sand filtration. One-half of this pretreated water was used as a control and passed first through an activated carbon filter and then through a cation exchanger. The other half of this pretreated water was demineralized with my apparatus being passed first through the cation exchanger then through the carbon filter. It should be noted that the pretreated water was identical for both schemes, that both carbon filters were the same volume and each activated carbon filter was rinsed with 20 bed volumes of distilled water to assure equilibrium. The flow rate through the apparatus was a controlled two gallons per minute per square foot for each filter. Both cation exchangers were of the same volume and the resin used was a steamed grade to assure removal of all organic materials. The following test results were achieved with each scheme:

SCHEME

Pretreatment→activated carbon column→cation exchanger column

| Sample location | Organic matter, mg./liter KMnO₄ consumption | pH |
| --- | --- | --- |
| Before activated carbon | 4.0 | 8.3 |
| After activated carbon | 0.6 | 8.3 |
| Before cation exchanger | 0.6 | 8.3 |
| After cation exchanger | 0.6 | 4.1 |

Pretreatment→cation exchanger column→activated carbon column

| Before cation exchanger | 4.0 | 8.3 |
| After cation exchanger | 4.2 | 3.7 |
| Before activated carbon | 4.2 | 3.7 |
| After activated carbon | 0.3 | 6.2 |

Thus, it will be appreciated that my invention accomplishes its intended objects by providing an improved low cost demineralizing system. By placing the activated carbon filter after the cation exchanger, the filter can operate at its maximum efficiency in an environment of low pH without the need for pretreating the carbon with a strong acid or injecting a strong acid upstream into the carbon filter. Furthermore, by permitting the carbon filter to operate at maximum efficiency, any subsequent anion exchange stage is less likely to become fouled by unfiltered organic material. While I have described the preferred embodiment of my invention, it will be readily apparent that various modifications can be made therein without changing the spirit and scope of the invention as set out in the appended claims. Having thus described my invention in detail, what I claim as new is:

I claim:

1. Apparatus for demineralizing water containing organic materials comprising:
   (a) a cation exchanger containing an ion exchange resin in the hydrogen form for removing metallic ions from said water, said cation exchanger producing an effluent which has a pH value lower than said water;
   (b) a bed of activated carbon having an increased organic absorptive capacity at low pH values disposed for removing said organic material from said effluent; and
   (c) means for passing said effluent from cation exchanger to said bed of activated carbon while maintaining said lowered pH value, whereby said cation exchanger produces the low pH values for increasing the organic absorptive capacity of said activated carbon.

2. Apparatus as set forth in claim 1 in which said effluent from said cation exchanger has a pH value between about 2 and 4.

3. Apparatus as set forth in claim 3 further comprising an anion exchanger disposed for treating the filtrate of said bed of activated carbon.

4. A method for demineralizing and purifying water containing organic materials and dissolved minerals comprising the method steps of:
  (a) treating said water in a cation exchanger containing an ion exchange resin in the hydrogen form to remove dissolved minerals and lower the pH value of said water to a point between values of about 2 and 4; and
  (b) passing the effluent of said cation exchanger through a filter bed of activated carbon to remove said organic materials, said filter bed of activated carbon having an increased absorptive capacity at said pH of between about 2 and 4.

5. The method as set forth in claim 4 further comprising treating the effluent of said filter with an anion exchanger to remove anions from said filter effluent, whereby said filter removes said organic materials to prevent fouling of said anion exchanger.

References Cited

UNITED STATES PATENTS

| | | | |
|---|---|---|---|
| 2,520,189 | 8/1950 | Zarow | 210—39 X |
| 2,595,290 | 5/1952 | Quinn | 210—39 X |
| 3,245,537 | 4/1966 | Burgess | 210—284 X |

SAMIH N. ZAHARNA, *Primary Examiner.*

U.S. Cl. X.R.

210—38, 39, 259, 284

PO-1050
(5/69)

UNITED STATES PATENT OFFICE
CERTIFICATE OF CORRECTION

Patent No. 3,444,079      Dated May 13, 1969

Inventor(s)    Herbert L. Bowers

It is certified that error appears in the above-identified patent and that said Letters Patent are hereby corrected as shown below:

Column 2, line 41 "preheat" should read --pretreat--.

Column 4, line 73 "claim 3" should read --claim 2--.

SIGNED AND
SEALED

AUG 26 1969

(SEAL)
Attest:

Edward M. Fletcher, Jr.
Attesting Officer

WILLIAM E. SCHUYLER, JR.
Commissioner of Patents